United States Patent [19]

Simpson et al.

[11] Patent Number: 5,178,769

[45] Date of Patent: Jan. 12, 1993

[54] FILTER FOR REMOVING LIQUID HYDROCARBONS FROM WATER AND PROCESS OF REMOVING GASEOUS AND/OR HYDROCARBONS FROM WATER

[75] Inventors: Stewart A. Simpson; Rock D. Dicke, both of Spring, Tex.

[73] Assignee: Hydrocarbon Filtration Systems Inc., Tomball, Tex.

[21] Appl. No.: 626,511

[22] Filed: Dec. 12, 1990

Related U.S. Application Data

[63] Continuation-in-part of Ser. No. 607,183, Oct. 31, 1990.

[51] Int. Cl.⁵ ............................................. B01D 15/08
[52] U.S. Cl. ................................... 210/671; 210/799; 210/496; 210/502.1
[58] Field of Search ............... 210/671, 680, 799, 287, 210/496, 502.1, 908

[56] References Cited

U.S. PATENT DOCUMENTS

| | | | |
|---|---|---|---|
| 3,791,990 | 2/1974 | Fischer | 210/691 |
| 4,696,742 | 9/1987 | Shimazaki | 210/287 |
| 4,829,045 | 5/1989 | Fransham | 210/242.4 |

FOREIGN PATENT DOCUMENTS

| | | | |
|---|---|---|---|
| 1160201 | 1/1984 | Canada | 502/401 |
| 2010500 | 10/1970 | Fed. Rep. of Germany | 210/924 |

*Primary Examiner*—Robert A. Dawson
*Assistant Examiner*—W. L. Millard
*Attorney, Agent, or Firm*—Sughrue, Mion, Zinn, Macpeak & Seas

[57] ABSTRACT

A filter for removing at least one hydrocarbon from water is disclosed where the active filter medium is fibrous peat which has been dried to a water content of 5 wt. % or less. A process for removing at least one hydrocarbon from contaminated water involves contacting the contaminated water with peat as described above. A filter assembly is also disclosed where at least two of the filters as described above are connected in series.

5 Claims, 1 Drawing Sheet

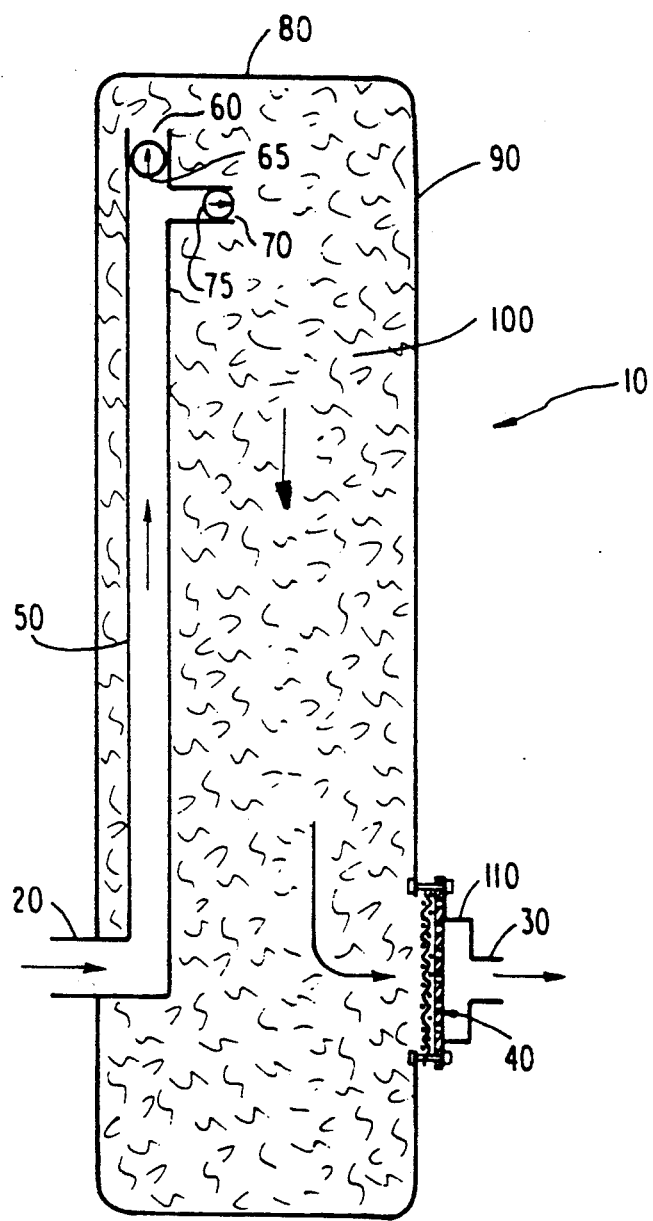

FILTER FOR REMOVING LIQUID HYDROCARBONS FROM WATER AND PROCESS OF REMOVING GASEOUS AND/OR HYDROCARBONS FROM WATER

CROSS-REFERENCE TO RELATED APPLICATION

This application is a continuation-in-part of U.S. application Ser. No. 07/607,183 filed Oct. 31, 1990, by Stewart Simpson et al. entitled FILTER FOR REMOVING LIQUID HYDROCARBONS FROM WATER AND PROCESS OF REMOVING GASEOUS AND/OR HYDROCARBONS FROM WATER.

BACKGROUND OF THE INVENTION

1. Field of the Invention

The present invention relates to a filter for removing gaseous and/or liquid hydrocarbons from water and to a process for removing gaseous and/or liquid hydrocarbons from water.

2. Description of the Prior Art

U.S. Pat. No. 3,791,990 Fischer discloses that peat may be used particularly to remove an oil film from water. The type of peat used is not specifically identified and is simply characterized as raw peat. After drying, the peat, which comprises peat fines and peat fiber, has a moisture content between 8% and 10%. In the environment of the present invention, there typically will not be any film, oil or otherwise, floating on the surface of the water.

U.S. Pat. No. 4,829,045 Fransham discloses the use of peat in the form of pellets for absorbing liquids and breaking emulsions. Fransham also discloses that the hydrophilic/hydrophobic properties of the pellets may be varied. The pellets in Fransham typically have a final moisture content of about 5 to 10 wt. %. Fransham discloses that free hydrocarbons may be removed from contaminated water by passing the contaminated water through a bed or a series of beds of peat pellets. The present invention does not contemplate the use of peat pellets. Fransham does not specify any particular species of peat.

SUMMARY OF THE INVENTION

The present invention provides a filter for removing gaseous and/or liquid hydrocarbon(s) from water and a process for removing gaseous and/or liquid hydrocarbon(s) from water which comprises passing the water containing the liquid hydrocarbon(s) through peat in fiber form, namely spaghnum peat. The spaghnum peat used in accordance with the present invention must have a moisture content of less than 5% by weight and the spaghnum peat must be in fiber form, i.e., it cannot be pelletized.

We have attempted to use peat with moisture contents of greater than 5% but less than 10%, greater than 10% but less than 15%, and greater than 15% but less than 45%. Peats exhibiting these moisture contents would not perform satisfactorily in the laboratory tests we conducted, rather, only peat with a moisture content as earlier discussed would permit the objects of the present invention to be achieved.

By passing the water contaminated with gaseous and/or liquid hydrocarbon(s) through the spaghnum peat of the present invention, since the spaghnum peat is hydrophobic, it does not absorb any water and since it is oleophilic, it will absorb any liquid or gaseous hydrocarbon present including chlorinated and aromatic solvents, aliphatics, ethers, alcohols and carbonyl compounds. Once the hydrocarbon is absorbed into the spaghnum peat it does not leach-back. This sphagnum peat has also demonstrated the capacity for removing solids, including trace metals, from the contaminated water.

The process in accordance with the present invention comprises passing the water which contains hydrocarbon(s) through a bed or beds of spaghnum peat in fiber form which has been dried initially to a moisture content of less than 5% by weight In a most preferred form of the present invention the dried spaghnum peat in fiber form is initially subjected to turbulent flow in the filter, whereupon extended processing life of the filter can be achieved.

An object of the present invention is to provide a filter and a process for removing liquid and gaseous hydrocarbon(s) from contaminated water where the liquid and gaseous hydrocarbon(s) can be substantially completed removed from the contaminated water, thereby yielding substantially pure water, and wherein the filter or the process can be practiced on-site.

BRIEF DESCRIPTION OF THE FIGURE

The Figure is a side schematic view of one preferred embodiment of a filter in accordance with the present invention.

DESCRIPTION OF THE PREFERRED EMBODIMENTS

There are many types of peat, some of which are hydrophobic, some of which are hydrophilic, and some of which exhibit mixed characteristics of hydrophobicity and hydrophilicity. Of the many types of peats which are available, we have found that only spaghnum peat dried to 5% moisture content or less in the fibrous form, permits all objects of the present invention to be met. Sphagnum peat dried to 5% moisture or less in fibrous form will simply be referred to as "peat" herein.

The peat used in the present invention is a mixture of fibers which have various sizes. Up to about ½ of the total volume of the peat is in the form of a fine dust, i.e., dust as fine as face powder in the low micron range, for example, 2 to 3 microns There is an insignificant amount of fine peat in the submicron size range. The peat is linear in form In the filter of the present invention and in the process of the present invention, the peat can be dried in any manner, taking care, of course, not to burn the peat We currently use a gas fired kiln, but contemplate air drying in a hot, arid atmosphere at, e.g., 85° F. or above, will save costs. The important factor is that the peat is reduced to a moisture content below 5 wt. % by weight based on total peat plus water weight The time for drying is not important and can be freely varied For example, we currently have our peat commercially dried in a gas kiln and this is normally a two hour or less process.

Of course, processing time considerations and energy considerations will impact the exact drying conditions used, but these can easily be established by one skilled in the art. The minimum water content is not important in any fashion, so long as the maximum water content is below 5% by weight, same basis. For example, we have used with success peat having a water content of 2–3% by weight, 4.5% by weight, etc. We always ensure a water content of less than 5% by weight, however. It is rather time and energy consuming, however, to dry to a water content less than about 5%, same basis Since we have done most of our work with liquid hydrocarbon(s), hereafter often we simply speak of hydrocarbon(s) or liquid hydrocarbon(s), where the present invention finds most usual application.

We currently contemplate that water contaminated with any type of hydrocarbon can be treated in accordance with the present invention due to the oleophilic nature of the peat of the present invention and the fact that once a hydrocarbon is absorbed it will not leach-back into the water being treated. A typical listing of liquid hydrocarbons which can be removed from contaminated water in accordance with the present invention includes gasoline, motor oil, diesel oil, benzene, toluene, alkyl benzenes such as ethyl benzene, o-, m- and p-xylene, chlorinated solvents, polychlorinated bisphenols, mixtures thereof, etc. We see no limitation on the nature of the liquid hydrocarbon(s) which can be removed from contaminated water in accordance with the present invention.

An important distinction is to be made between using fibrous peat to simply remove liquid hydrocarbons such as oil from the surface of water and the filtration in accordance with the present invention where liquid hydrocarbons are actually removed from the entire mass of the contaminated liquid water being treated For example, gasoline will go into solution with water in an amount of 300 to 400 ppm. Assuming 1,000 ppm of gasoline, this would be present as 300 to 400 ppm in solution and 600 to 700 ppm in the form of a sheen or a free floating product on the contaminated water. Another type of contaminated water is known as a free phase product. Assuming here there is 1,000 ppm of gasoline, the entire 1,000 ppm of gasoline would be in solution In fact, one can encounter contaminated water with as much as 10,000 to 15,000 ppm or more of liquid hydrocarbons in the form of a free phase product. Typically such will result from other contaminants such as acetone, $CH_3O_3$, etc., being present, which causes the gasoline to go into total solution. The filter and filtration process of the present invention can be used to treat all such types of contaminated water.

The substantial differences between simply using peat to absorb an oil film floating on the surface of water and filtration in accordance with the present invention can easily be appreciated by an expansion of the above discussion regarding gasoline. As indicated, gasoline will come in to solution (naturally) with water somewhere around 375 ppm T.P.H (total parts of hydrocarbons). This means that if you remove a film of gasoline from the surface of the water, you will still have around 375 ppm T.P.H. This is classified as a hazardous material The amount of T.P.H which is allowed to be pumped into a waste water treatment sewer, or even into a river, varies from region to region. In some regions the T.P.H content can be as high as 15 ppm while in other regions the T.P.H content must be 0 ppm. Simply removing the oil film from the surface does not address this problem. The filter of the present invention has taken samples of contaminated water with a gasoline content of, for example, 1,000 ppm, and has filtered it to less than 1 ppm. The present invention also permits one to address the problem of the removal of BTEX (the organics benzene, toluene, ethylbenzene, and the isomeric forms of xylene) from contaminated water. In most regions, BTEX must be lower than 500 parts per billion (ppb). We have been successful in lowering BTEX to less than 2 parts per billion.

The pressure required for using the filter of the present invention in the process of the present invention is not overly important so long as the contaminated water can be forced through the mass of peat fiber in the filter. So long as this effect is achieved, one can successfully practice the present invention. As a practical matter, however, we have typically used pressures on the order of 15 to 20 psig in apparatus as later described.

In a similar fashion, the temperature of the process of the present invention is not overly important, and to date we see no benefits to processing at other than normal ambient temperature, that is, the temperature of the location involved. Since a major advantage of the present invention is that on-site removal of liquid hydrocarbons from contaminated water can be achieved, e.g., contaminated water from gasoline service stations, or contaminated water from underground storage tanks, obviously processing will typically be at ambient temperature. As will be apparent to one skilled in the art, of course, the temperature must be sufficiently high so that the contaminated water does not freeze.

Since the peat in accordance with the present invention pulls out hydrocarbons from contaminated water quickly upon contact, the time of processing in accordance with the present invention is not overly important so long as the desired amount of hydrocarbon(s) is removed. Generally, the longer the contact or residence time the better, but when residence time is too long (flow is too low), the procedure becomes uneconomical For a system as described in the EXAMPLE, a flow of 5 gpm/series is a fast flow whereas much below 3½ gpm/series, while providing good results, results in rather long processing times. A total residence time of 45 minutes in a system as described in the EXAMPLE is economically and technically quite good for apparatus as described. Residence time can, however, be freely varied by one skilled in the art so long as the desired degree of hydrocarbon removal is accomplished from the contaminated water.

The ratio of the volume of peat in the filter to the volume of contaminated water is also not overly important and can easily be determined by one skilled in the art. Such ratios are in direct relation to the type and concentration of hydrocarbons present in the contaminated water as earlier explained.

In one preferred embodiment of the present invention, the filters of the present invention are used in a phased array where, for example, five filters which are otherwise identical are connected in series. The filters are vertically oriented with an inlet pipe and discharge pipe at the bottom of each filter. This configuration has proven most practical for ease of transportation to the processing site on a flat-bed truck We see no reason why horizontal orientation of the filters or placing the inlet and discharge pipes at the top of the filter would not be operable, but we see no advantages thereto.

Similarly, the filters need not be identical, but this lowers construction cost.

Assuming contaminated water with an initial liquid hydrocarbon content of 1,000 ppm, 90% of the liquid hydrocarbons can be removed per phase or stage. Thus, the contaminated water leaving the first stage would have 900 ppm of liquid hydrocarbon(s) removed and would have 100 ppm remaining, the contaminated water coming out of the second stage would have 90 ppm removed and would have 10 ppm remaining, the contaminated water coming out of the third stage would have 9 ppm removed and one 1 ppm remaining, and the contaminated water, which is no longer contaminated, would have 0.9 ppm removed in the fourth stage and would have 0.1 ppm remaining. Of course, a lesser number of stages including even one stage or a greater number of stages could be used, if desired. In the above discussion, the second, third and fourth stages can be viewed as polishing stages, as could a fifth or greater stage, if used. All analysis which we have performed have been in accordance with ENVLAP, NIOSH, AIHA and EPA recommended procedures As a specific example of a filter system in accordance with the present invention which can be used for on-site processing, we contemplate a mobile filter unit which is mounted on a tandem axle trailer. Assuming three filters in series and five lines of such filters in parallel, a total of 15 filters would be used. Assuming 44 liters (approximately 18 pounds) of dry peat in accordance with the present invention in each filter, we have achieved a flow rate of four gallons per minutes (4 GPM) per filter line. Thus, with the series of five lines, we can achieve a total flow rate of 20 gpm. The contaminated water can be introduced into a single pipe which feeds each filter line and then the processed or clean water can be removed by passing the clean, pure water from each filter line into a single pipe for removal of the clean water.

Each pound of the peat in accordance with the present invention can remove or absorb varying amounts of hydrocarbon, depending on the heaviness or viscosity thereof. Generally, a heavier hydrocarbon, such as Bunker C oil, will be absorbed in a greater amount, for example, 12 pounds per pound of peat, whereas a lighter hydrocarbon such as benzene, toluene, etc., will be absorbed in a lesser amount such as, for example 6 pounds per pound of peat. When a filter is "loaded" with liquid hydrocarbon(s), i.e., it has reached its maximum absorption capacity, we typically simply replace all the peat in a filter line or bank due to the economics involved. Usually the first stage filter, if there is more than one stage, will be the first to saturate, and that time we change all filters.

The dried peat used in the filter and filtration process of the present invention varies in size from the low micron range up to $\frac{1}{2}''$ or more in length. The smaller particles can be a cause of concern with respect to clogging upon use of the peat in a filter in accordance with the present invention. These small particles are commonly called peat dust in the art, and, as indicated, comprise about $\frac{1}{2}$ of the total volume of the peat.

We do not currently foresee that the exact shape of the filter is especially restricted nor is the location of the inlet and/or outlet means particularly restricted. For example, one might contemplate a straight flow system where contaminated water is introduced at one end of the filter and passes in one direction to exit out the other end of the filter. As possible alternatives, contaminated water might be introduced from both ends of the filter and discharged from somewhere between both ends from one or a plurality of outlets, or be introduced along a plurality of points along the length of the filter directly into the mass of peat and discharged from one or a plurality of outlets at one or both ends or along the length of the filter. Except for the first "straight through flow" embodiment, none of these embodiments appear to offer simplicity of construction, however.

Our most preferred form of the present invention easily permits extended operation to be achieved. While the present invention is not limited thereto, we are unaware of anyone who has contemplated a similar type of preferred filter in accordance with the present invention.

A problem that one can encounter is if one simply places the peat in accordance with the present invention into a filter casing and flows water through it, is that the smaller particles of peat can migrate through the larger particles and cause a bridge at the discharge end which can drastically reduce or stop the flow. Our most preferred filter in accordance with the present invention is schematically illustrated in the Figure. By using a device as shown in the Figure, a slight but detectable degree of turbulence can be created in the contaminated water being processed. This degree of turbulence is enough to keep the peat in a swirling motion and, at the same time, this swirling motion settles the peat dust. Once the peat dust is settled, it is relatively evenly distributed throughout the mass of peat in the filter and, at that time, the peat will cease movement and will start packing At this point in time, however, any packing phenomenon does not create any problem because the even distribution of the peat dust and the large peat particles create flow paths through the body of peat in the filter which allows the water to migrate or flow through the body of the peat. The peat is hydrophobic (will not absorb water), but it will become "water wet". This does not mean that the peat has absorbed the water to a large degree, but rather, that the water has adhered to the surface area of the peat. It is that effect which can cause packing problems. However, because the peat is only oleophilic, even when the peat is totally submerged in water, as it is in the filter of the present invention during use, it will still absorb any hydrocarbon that comes in contact with its surface area.

With reference to the Figure, in this embodiment (the turbulent flow embodiment) the filter comprises a square casing 10 formed of any desired material which is compatible with the contaminated water being processed, for example, steel. Any material known in the art can be used to form the filter casing since the conditions of operation in accordance with the present invention are relatively mild. In this particular embodiment, the dimensions of the filter were as follows: length-1 ft.; width-1 ft.; height-4 ft. The exact dimensions of the filter are not overly important since it is the volume of the peat and the total volume of contaminated water to be treated which determine when peat saturation will occur. We have found the above size to be convenient to work with for the on-site applications we have been involved with. Each filter is provided with an intake pipe 20 and a discharge pipe 30, the discharge pipe 30 being connected to removable filter means 40 to prevent the peat from exiting the filter with the pure water.

In this particular embodiment, the filters used while vertically oriented. As a consequence, intake pipe 20 has connected thereto vertical riser 50 which has at the top thereof an opening 60 which has a $\frac{3}{4}''$ diameter check valve 65 and discharge pipe 70 which has a $\frac{1}{2}''$ diameter check valve 75. Opening 60 is disposed so as to permit the contaminated water to exit in a substantially vertical direction, against the top 80 of the filter 10 and then flow downward as indicated by the arrows. On the other hand, discharge pipe 70 is disposed in a direction substantially perpendicular to the direction of flow of outlet 60 so as to permit the water to exit from discharge pipe 70 in a direction towards the wall 90 of the filter 10.

Of course, the upward flow of contaminated water and the sideways flow of contaminated water into the peat need not be absolutely vertical and absolutely horizontal, and these two flows need not be absolutely perpendicular to each other; all that is needed is that the flows be oriented so as to provide the desired initial turbulence and swirling of the peat in this particular embodiment.

We have found that the exact distance that outlet 60 and discharge pipe 70 are located above discharge pipe 30 can be varied substantially in accordance with the present invention, but we currently find that if they are located about one-half way up the filter between the top of the removable filter means 40 and the top 80 of the filter, best results are obtained, i.e., about half way up the filter. We have found that the combination of outlet 60 and discharge pipe 70 can be used at the very top of the filter, however, so long as there is sufficient room for the water to exit outlet 60. Similarly, the distance that discharge pipe 70 should be spaced from wall 90 of the filter is not overly important so long as the water can exit discharge pipe 70 and create the desired swirling motion in the peat 100 contained in the filter 10.

The distance between outlet 60 and discharge pipe 70, namely the discharge pipe having a $\frac{3}{4}''$ diameter check valve 65 and the discharge pipe having the $\frac{1}{2}''$ diameter check valve 75, is not important so long as the desired swirling motion is achieved. In the embodiment shown in the Figure the distance is about $\frac{1}{2}''$ from the top of the $\frac{1}{2}''$ discharge pipe 70 and the top of the $\frac{3}{4}''$ outlet 60. The object of using the combination of outlets 60 and discharge pipe 70 shown at the top of the filter 10 is to create the desired swirling motion in the peat 100. It is desired that most of the flow of the contaminated water exit outlet 60 as opposed to discharge pipe 70, and this is achieved by using a larger diameter for the outlet 60. For example, with a total flow of contaminated water of 4 gpm, about 3 gpm would exit the outlet 60 and about 1 gpm would exit the discharge pipe 70. The velocity of the contaminated water exiting the discharge pipe 70 which has the smaller diameter is, of course, faster than the velocity of the water exiting the outlet 60 which has the larger diameter. For example, with conditions as earlier mentioned, the velocity of the contaminated water exiting the $\frac{1}{2}''$ diameter discharge pipe 70 is equal to or more than twice the velocity of the contaminated water exiting the outlet 60. It is this "faster jet" of water which exits the smaller diameter discharge pipe 70 which creates the swirling effect in the mass of peat 100 so that there is no channeling effect and the peat eventually compacts before all of the peat powder is at the removable filter means 40 which would result in blocking.

Obviously, the $\frac{3}{4}''$ and $\frac{1}{2}''$ dimensions are simply given as representative and these dimensions can be freely varied so long as the desired flow rate of contaminated water is achieved and the desired swirling effect is achieved.

Turning now to removable filter means 40, this can be any means which permits the peat to be retained in the filter and permits the water to be discharged via discharge line 30. It will typically be removable and held in place by bolts so that the spent or loaded peat can be removed from the filter 10 and replaced with clean peat. We typically prefer to use 70 gauge screen wire at the point of contact with the peat. This is bolted to removable steel cover plate 110 with a perforated header plate therebetween. The bolts can then be removed and the perforated header plate and 70 gauge screen wire removed, whereupon the spent peat can be scooped out of the filter and replaced with fresh peat. Any equivalent means to retain the peat and prevent the exit of fine peat particles with the clean water and permit spent peat removal can be used, as will be apparent to one skilled in the art. The 70 gauge screen wire is essentially a 0.0106'' diameter filter and prevents peat having that or a larger particle size from passing through the filter screen and entering the clean water. As indicated, the amounts of submicron size peat is insignificant.

The following non-limiting working Example is now presented.

EXAMPLE

Each filter used was as earlier described with respect to the turbulent flow embodiment, being vertically oriented and having the dimensions, vertical riser and $\frac{3}{4}''$ and $\frac{1}{2}''$ check valves spaced $\frac{1}{2}''$ apart and oriented as earlier described, so that the $\frac{3}{4}''$ check valve was vertical and the $\frac{1}{2}''$ check valve was horizontal. The outlet of the $\frac{3}{4}''$ check valve was about 21'' from the top of the filter and the outlet of the $\frac{1}{2}''$ check valve was about 7'' from the side of the filter which contained the removable filter means which was constructed as earlier described. Three filters were used in series and 5 series of three filters each were used in parallel for a total of 15 filters, thereby achieving the earlier indicated phasing effect. All inlets of the first stage filters were fed from a common pipe and all discharge outlets of the third stage filters were fed to a common pipe to simplify the apparatus. The flow of contaminated water was 4 gpm through each of the 5 series of filters for a total flow of $4 \times 5 = 20$ gpm. In each filter the flow through the $\frac{3}{4}''$ outlet was 3 gpm and the flow through the $\frac{1}{2}''$ outlet was 1 gpm. Operation was at ambient temperature (about 80° F.) and the contaminated water was introduced at a flow of 15-20 psig. Eighteen pounds of spaghnum peat of the blonde variety was packed into each filter and filled each filter. Spaghnum peat of the blond variety is simply young peat. We currently prefer to use this type of peat, but the exact type of variety of peat used is not important. About half the volume of the peat had a fine particle size on the order of 2-3 microns. The remaining $\frac{1}{2}$ the volume of the peat comprised larger sizes up to $\frac{1}{2}''$ in length. All of the peat was in fiber form. The peat had been dried in a gas kiln in the air to a final moisture content of less than 5% by weight based on the weight of the final peat product.

Upon the introduction of the contaminated water into the filter, there was a swirling or turbulent flow at startup for about 60 minutes, whereafter there was no longer swirling or turbulent flow.

The contaminated water contained 1000 ppm of liquid hydrocarbon contaminants, the contaminants being unleaded gasoline, benzene, toluene, ethylbenzene and xylene.

Analysis at the discharge outlet of each filter showed:

| After Approximate Gallons | Contaminants Remaining |
| --- | --- |
| 100 | 5.68 ppm |
| 200 | 6.57 ppm |
| 300 | 7.60 ppm |
| 400 | 8.88 ppm |

| After Approximate Gallons | Contaminants Remaining |
|---|---|
| 500 | 5.30 ppm |

Operation was conducted at the above conditions for about one (1) hour. At that time the peat in the first stage filter became contaminated.

While the invention has been described in detail and with reference to specific embodiments thereof, it will be apparent to one skilled in the art that various changes and modification can be made therein without departing from the spirit and scope thereof.

What is claimed is:

1. A packed filter for removing at least one hydrocarbon from water contaminated with said liquid hydrocarbon which comprises a filter casing, an inlet for said contaminated water and an outlet for said contaminated water, said filter casing having contained therein fibrous spaghnum peat which has been dried to a water content of 5 wt. % or less based on the weight of said peat and the water.

2. The filter of claim 1 which further comprises inside said casing first means oriented to introduce a first stream of said contaminated water into said peat and second means oriented substantially perpendicular to said first means to introduce a second stream of said contaminated water into said peat in a direction substantially perpendicular to said first stream of contaminated water.

3. A process for removing at least one hydrocarbon from contaminated water which comprises contacting said contaminated water with fibrous spaghnum peat, said peat having been dried to a moisture content of 5% or less based on the weight of the peat and the water, said peat absorbing said hydrocarbon from said contaminated water.

4. The process of claim 3, wherein said contacting of said contaminated water with said peat comprises an initial contacting of said contaminated water with said peat under turbulent conditions, whereby channels which permit said contaminated water to flow through said peat during subsequent non-turbulent contacting of said contaminated water with said peat can be conducted.

5. The process of claim 4, wherein said turbulent contacting is achieved by introducing two streams of said contaminated water into said peat at directions substantially perpendicular to each other.

* * * * *

UNITED STATES PATENT AND TRADEMARK OFFICE
CERTIFICATE OF CORRECTION

PATENT NO. : 5,178,769
DATED : January 12, 1993
INVENTOR(S) : Stewart A. Simpson, et al It is certified that error appears in the above-indentified patent and that said Letters Patent is hereby corrected as shown below:

Col. 9, claim 1, line 6, after "fibrous", insert --blond--.

Col. 10, claim 3, line 3, after "fibrous", insert --blond--.

Signed and Sealed this

Twenty-fourth Day of August, 1993

Attest:

BRUCE LEHMAN

Attesting Officer          Commissioner of Patents and Trademarks